(12) United States Patent
Strong et al.

(10) Patent No.: US 10,975,612 B2
(45) Date of Patent: Apr. 13, 2021

(54) SEALS FOR ELECTROCHROMIC WINDOWS

(71) Applicant: View, Inc., Milpitas, CA (US)

(72) Inventors: Fabian Strong, Hayward, CA (US); Robin Friedman, Sunnyvale, CA (US)

(73) Assignee: View, Inc., Milpitas, CA (US)

( * ) Notice: Subject to any disclaimer, the term of this patent is extended or adjusted under 35 U.S.C. 154(b) by 263 days.

(21) Appl. No.: 15/535,681

(22) PCT Filed: Dec. 10, 2015

(86) PCT No.: PCT/US2015/064942
§ 371 (c)(1),
(2) Date: Jun. 13, 2017

(87) PCT Pub. No.: WO2016/100075
PCT Pub. Date: Jun. 23, 2016

(65) Prior Publication Data
US 2018/0024408 A1 Jan. 25, 2018

Related U.S. Application Data

(60) Provisional application No. 62/092,188, filed on Dec. 15, 2014.

(51) Int. Cl.
*E06B 3/663* (2006.01)
*G02F 1/153* (2006.01)
(Continued)

(52) U.S. Cl.
CPC ...... *E06B 3/66342* (2013.01); *E06B 3/66352* (2013.01); *E06B 3/6722* (2013.01);
(Continued)

(58) Field of Classification Search
CPC ............ E06B 3/66342; E06B 3/66352; E06B 3/6722; E06B 3/67326; E06B 9/24;
(Continued)

(56) References Cited

U.S. PATENT DOCUMENTS

| | | |
|---|---|---|
| 4,306,140 A | 12/1981 | Stromquist |
| 4,393,105 A | 7/1983 | Kreisman |

(Continued)

FOREIGN PATENT DOCUMENTS

| | | |
|---|---|---|
| CH | 525376 A | 7/1972 |
| CN | 1380991 A | 11/2002 |

(Continued)

OTHER PUBLICATIONS

Preliminary Amendment filed Apr. 16, 2018 in U.S. Appl. No. 15/866,379.
(Continued)

*Primary Examiner* — Theodore V Adamos
(74) *Attorney, Agent, or Firm* — Weaver Austin Villeneuve & Sampson LLP; Brian D. Griedel

(57) ABSTRACT

Embodiments herein relate to methods and apparatus for preventing and mitigating the ingress of moisture into an interior region of an IGU. Various techniques are disclosed including, for example, the use of a strain relief structure around wires passing through a secondary seal, improved materials for coating the wires, and additional/improved layers for bonding the secondary seal to tape provided around a spacer.

32 Claims, 7 Drawing Sheets

(51) Int. Cl.
*G02F 1/161* (2006.01)
*E06B 3/67* (2006.01)
*E06B 3/673* (2006.01)
*E06B 9/24* (2006.01)

(52) U.S. Cl.
CPC ............ *E06B 3/67326* (2013.01); *E06B 9/24* (2013.01); *G02F 1/153* (2013.01); *G02F 1/161* (2013.01); *E06B 2009/2464* (2013.01); *G02F 2201/503* (2013.01)

(58) Field of Classification Search
CPC .. E06B 2009/2464; G02F 1/153; G02F 1/161; G02F 2201/506
See application file for complete search history.

(56) References Cited

U.S. PATENT DOCUMENTS

| | | | |
|---|---|---|---|
| 4,893,908 A | 1/1990 | Wolf et al. | |
| 4,941,302 A | 7/1990 | Barry | |
| 4,942,704 A * | 7/1990 | King | E06B 3/677 428/34 |
| 5,106,663 A * | 4/1992 | Box | E06B 3/66342 156/109 |
| 5,170,108 A | 12/1992 | Peterson et al. | |
| 5,313,761 A | 5/1994 | Leopold | |
| 5,379,146 A | 1/1995 | Defendini | |
| 5,384,653 A * | 1/1995 | Benson | E06B 3/6722 359/265 |
| 5,657,149 A | 8/1997 | Buffat et al. | |
| 5,657,150 A | 8/1997 | Kallman et al. | |
| 5,724,175 A | 3/1998 | Hichwa et al. | |
| 5,819,499 A * | 10/1998 | Evason | E06B 3/66352 52/788.1 |
| 5,877,936 A | 3/1999 | Nishitani et al. | |
| 5,948,195 A | 9/1999 | Thomas | |
| 6,001,487 A | 12/1999 | Ladang et al. | |
| 6,045,896 A | 4/2000 | Boire et al. | |
| 6,055,088 A | 4/2000 | Fix et al. | |
| 6,055,089 A | 4/2000 | Schulz et al. | |
| 6,068,720 A | 5/2000 | McHugh | |
| 6,176,715 B1 | 1/2001 | Buescher | |
| 6,204,953 B1 | 3/2001 | Zieba et al. | |
| 6,261,641 B1 | 7/2001 | Zieba et al. | |
| 6,337,758 B1 | 1/2002 | Beteille et al. | |
| 6,369,935 B1 | 4/2002 | Cardinal et al. | |
| 6,407,847 B1 | 6/2002 | Poll et al. | |
| 6,420,071 B1 | 7/2002 | Lee et al. | |
| 6,509,999 B1 | 1/2003 | Shelepin et al. | |
| 6,529,308 B2 | 3/2003 | Beteille et al. | |
| 6,559,411 B2 | 5/2003 | Borgeson et al. | |
| 6,567,708 B1 | 5/2003 | Bechtel et al. | |
| 6,795,226 B2 | 9/2004 | Agrawal et al. | |
| 6,897,936 B1 | 5/2005 | Li et al. | |
| 6,919,530 B2 | 7/2005 | Borgeson et al. | |
| 7,002,720 B2 | 2/2006 | Beteille et al. | |
| 7,033,655 B2 | 4/2006 | Beteille et al. | |
| 7,230,748 B2 | 6/2007 | Giron et al. | |
| 7,362,491 B2 | 4/2008 | Busick et al. | |
| 7,531,101 B2 | 5/2009 | Beteille | |
| 7,586,664 B2 | 9/2009 | O'Shaughnessy et al. | |
| 7,710,671 B1 | 5/2010 | Kwak et al. | |
| 7,869,114 B2 | 1/2011 | Valentin et al. | |
| 7,894,119 B2 | 2/2011 | Valentin et al. | |
| 7,929,194 B2 | 4/2011 | Legois et al. | |
| 7,941,982 B2 | 5/2011 | Merica | |
| 8,035,882 B2 | 10/2011 | Fanton et al. | |
| 8,213,074 B1 | 7/2012 | Shrivastava et al. | |
| 8,254,013 B2 | 8/2012 | Mehtani et al. | |
| 8,300,298 B2 | 10/2012 | Wang et al. | |
| 8,432,603 B2 | 4/2013 | Wang et al. | |
| 8,514,476 B2 | 8/2013 | Egerton et al. | |
| 8,643,933 B2 | 2/2014 | Brown et al. | |
| 8,669,503 B2 | 3/2014 | Johnson et al. | |
| 8,711,465 B2 | 4/2014 | Bhatnagar et al. | |
| 8,800,221 B1 | 8/2014 | Header | |
| 8,810,889 B2 | 8/2014 | Brown et al. | |
| 9,019,588 B2 | 4/2015 | Brown et al. | |
| 9,158,173 B2 | 10/2015 | Bhatnagar et al. | |
| 9,360,280 B2 | 6/2016 | White et al. | |
| 9,442,339 B2 | 9/2016 | Parker et al. | |
| 9,897,888 B2 | 2/2018 | Bhatnagar et al. | |
| 9,910,336 B2 | 3/2018 | Parker et al. | |
| 9,958,750 B2 | 5/2018 | Parker et al. | |
| 10,139,696 B2 | 11/2018 | Brown et al. | |
| 10,139,697 B2 | 11/2018 | Wilbur et al. | |
| 10,444,589 B2 | 10/2019 | Parker et al. | |
| 10,782,583 B2 | 9/2020 | Bhatnagar et al. | |
| 10,901,286 B2 | 1/2021 | Parker et al. | |
| 2002/0075552 A1 | 6/2002 | Poll et al. | |
| 2003/0041533 A1 | 3/2003 | Trpkivski | |
| 2003/0137712 A1 | 7/2003 | Westfall et al. | |
| 2003/0227663 A1 * | 12/2003 | Agrawal | B32B 17/10036 359/265 |
| 2004/0047050 A1 | 3/2004 | Bauer et al. | |
| 2005/0002081 A1 | 1/2005 | Beteille et al. | |
| 2005/0166495 A1 | 8/2005 | Cho et al. | |
| 2006/0077511 A1 | 4/2006 | Poll et al. | |
| 2006/0132923 A1 | 6/2006 | Hsiao et al. | |
| 2006/0187608 A1 | 8/2006 | Stark | |
| 2006/0283084 A1 | 12/2006 | Johnson | |
| 2007/0003726 A1 | 1/2007 | Swannell | |
| 2007/0020442 A1 | 1/2007 | Giron et al. | |
| 2007/0022700 A1 | 2/2007 | Gallagher | |
| 2007/0067048 A1 | 3/2007 | Bechtel et al. | |
| 2007/0103761 A1 | 5/2007 | Giron et al. | |
| 2007/0133078 A1 | 6/2007 | Fanton et al. | |
| 2007/0138949 A1 | 6/2007 | Yoshida et al. | |
| 2007/0248756 A1 | 10/2007 | Krisko et al. | |
| 2008/0041434 A1 * | 2/2008 | Adriani | B23K 31/02 136/244 |
| 2008/0238706 A1 | 10/2008 | Kenwright et al. | |
| 2008/0289682 A1 * | 11/2008 | Adriani | B32B 17/10018 136/251 |
| 2009/0058295 A1 | 3/2009 | Auday et al. | |
| 2009/0067031 A1 | 3/2009 | Piroux et al. | |
| 2009/0097098 A1 | 4/2009 | Piroux | |
| 2009/0110918 A1 | 4/2009 | Jacquiod et al. | |
| 2009/0114262 A1 * | 5/2009 | Adriani | H02S 40/36 136/244 |
| 2009/0114928 A1 | 5/2009 | Messere et al. | |
| 2009/0130409 A1 | 5/2009 | Reutler et al. | |
| 2009/0148642 A1 | 6/2009 | Mauser et al. | |
| 2009/0174300 A1 | 7/2009 | Jousse et al. | |
| 2009/0181203 A1 | 7/2009 | Valentin et al. | |
| 2009/0251758 A1 | 10/2009 | Valentin et al. | |
| 2009/0262411 A1 | 10/2009 | Karmhag et al. | |
| 2009/0297806 A1 | 12/2009 | Dawson-Elli et al. | |
| 2009/0323160 A1 | 12/2009 | Egerton et al. | |
| 2009/0323162 A1 | 12/2009 | Fanton et al. | |
| 2010/0208326 A1 | 8/2010 | Kwak et al. | |
| 2010/0243427 A1 | 9/2010 | Kozlowski et al. | |
| 2010/0245973 A1 | 9/2010 | Wang et al. | |
| 2011/0043885 A1 | 2/2011 | Lamine et al. | |
| 2011/0048614 A1 | 3/2011 | Veerasamy | |
| 2011/0051221 A1 * | 3/2011 | Veerasamy | B32B 17/10045 359/275 |
| 2011/0059275 A1 | 3/2011 | Stark | |
| 2011/0061319 A1 | 3/2011 | Anderson et al. | |
| 2011/0094585 A1 | 4/2011 | Debije et al. | |
| 2011/0148218 A1 | 6/2011 | Rozbicki et al. | |
| 2011/0211247 A1 | 9/2011 | Kozlowski et al. | |
| 2011/0216389 A1 | 9/2011 | Piroux et al. | |
| 2011/0249314 A1 | 10/2011 | Wang et al. | |
| 2011/0260961 A1 | 10/2011 | Burdis | |
| 2011/0261429 A1 | 10/2011 | Sbar et al. | |
| 2011/0266137 A1 | 11/2011 | Wang et al. | |
| 2011/0266138 A1 | 11/2011 | Wang et al. | |
| 2011/0267672 A1 | 11/2011 | Sbar et al. | |
| 2011/0267674 A1 | 11/2011 | Wang et al. | |
| 2011/0267675 A1 | 11/2011 | Wang et al. | |
| 2011/0292488 A1 | 12/2011 | McCarthy et al. | |
| 2011/0299149 A1 | 12/2011 | Park et al. | |

(56) References Cited

U.S. PATENT DOCUMENTS

| | | | |
|---|---|---|---|
| 2012/0026573 A1 | 2/2012 | Collins et al. | |
| 2012/0033287 A1* | 2/2012 | Friedman | C03C 17/34 |
| | | | 359/275 |
| 2012/0062975 A1 | 3/2012 | Mehtani et al. | |
| 2012/0140492 A1 | 6/2012 | Alvarez | |
| 2012/0147449 A1* | 6/2012 | Bhatnagar | B32B 17/10055 |
| | | | 359/275 |
| 2012/0194895 A1 | 8/2012 | Podbelski et al. | |
| 2012/0200908 A1 | 8/2012 | Bergh et al. | |
| 2012/0239209 A1 | 9/2012 | Brown et al. | |
| 2012/0268803 A1 | 10/2012 | Greer et al. | |
| 2012/0300280 A1 | 11/2012 | Murphy et al. | |
| 2012/0327499 A1 | 12/2012 | Parker et al. | |
| 2013/0157493 A1* | 6/2013 | Brown | H01R 41/00 |
| | | | 439/247 |
| 2013/0241299 A1 | 9/2013 | Snyker et al. | |
| 2013/0278988 A1 | 10/2013 | Jack et al. | |
| 2013/0278989 A1* | 10/2013 | Lam | B60J 3/04 |
| | | | 359/275 |
| 2013/0305656 A1* | 11/2013 | Ripoche | E06B 3/66352 |
| | | | 52/786.13 |
| 2013/0319756 A1 | 12/2013 | Snyker et al. | |
| 2014/0000191 A1 | 1/2014 | Snyker et al. | |
| 2014/0041933 A1 | 2/2014 | Snyker et al. | |
| 2014/0160550 A1 | 6/2014 | Brown et al. | |
| 2014/0170863 A1 | 6/2014 | Brown | |
| 2014/0192393 A1 | 7/2014 | Bhatnagar et al. | |
| 2014/0247475 A1* | 9/2014 | Parker | B32B 17/10055 |
| | | | 359/275 |
| 2014/0305053 A1* | 10/2014 | Sonderkr | E06B 3/5454 |
| | | | 52/204.593 |
| 2014/0340731 A1 | 11/2014 | Strong et al. | |
| 2014/0349497 A1 | 11/2014 | Brown et al. | |
| 2014/0355097 A1 | 12/2014 | Brown et al. | |
| 2015/0092260 A1 | 4/2015 | Parker et al. | |
| 2015/0118869 A1 | 4/2015 | Brown et al. | |
| 2015/0219975 A1 | 8/2015 | Phillips et al. | |
| 2015/0346575 A1 | 12/2015 | Bhatnagar et al. | |
| 2016/0089869 A1 | 3/2016 | Parker et al. | |
| 2016/0154290 A1 | 6/2016 | Brown et al. | |
| 2016/0334689 A1 | 11/2016 | Parker et al. | |
| 2016/0363831 A1 | 12/2016 | Ash et al. | |
| 2017/0362882 A1* | 12/2017 | Boucher | E06B 3/66333 |
| 2018/0024408 A1 | 1/2018 | Strong et al. | |
| 2018/0157140 A1 | 6/2018 | Bhatnagar et al. | |
| 2018/0196325 A1 | 7/2018 | Parker et al. | |
| 2018/0364539 A1* | 12/2018 | Rozbicki | G02F 1/157 |
| 2019/0210346 A1 | 7/2019 | Parker et al. | |
| 2019/0391456 A1 | 12/2019 | Parker et al. | |
| 2020/0348574 A1 | 11/2020 | Bhatnagar et al. | |

FOREIGN PATENT DOCUMENTS

| | | |
|---|---|---|
| CN | 1734325 A | 2/2006 |
| CN | 1779527 A | 5/2006 |
| CN | 1784631 A | 6/2006 |
| CN | 1822951 A | 8/2006 |
| CN | 1984549 A | 6/2007 |
| CN | 201228500 Y | 4/2009 |
| CN | 202108407 U | 1/2012 |
| DE | 3918913 A1 | 12/1989 |
| DE | 19611245 A1 | 9/1997 |
| DE | 102006042538 | 3/2008 |
| EP | 2136409 | 12/2009 |
| EP | 2348357 | 7/2011 |
| GB | 1437198 | 5/1976 |
| JP | 2000-257352 A | 9/2000 |
| JP | 2001-193364 | 7/2001 |
| JP | 2008-542578 A | 11/2008 |
| JP | 2011-526378 A | 10/2011 |
| TW | 521118 | 2/2003 |
| TW | M266467 | 6/2005 |
| TW | I253182 | 4/2006 |
| TW | 200731571 A | 8/2007 |
| TW | I291073 | 12/2007 |
| TW | 201029838 A | 8/2010 |
| TW | 201120552 A | 6/2011 |
| TW | 201215981 A | 4/2012 |
| WO | WO2002/008826 A1 | 1/2002 |
| WO | WO2003/001290 A1 | 1/2003 |
| WO | WO2005/076061 | 8/2005 |
| WO | WO2006/133298 A2 | 12/2006 |
| WO | WO2006/133298 A3 | 12/2007 |
| WO | WO2008/043951 | 4/2008 |
| WO | WO2009/145876 | 12/2009 |
| WO | WO2009/148861 | 12/2009 |
| WO | WO2011/010067 | 1/2011 |
| WO | WO2011/028253 | 3/2011 |
| WO | WO2011/028254 | 3/2011 |
| WO | WO2011/050291 | 4/2011 |
| WO | WO2011/109688 | 9/2011 |
| WO | WO2012/078634 A2 | 6/2012 |
| WO | WO2012/102964 A1 | 8/2012 |
| WO | WO2012/145155 | 10/2012 |
| WO | WO2013/090264 | 6/2013 |
| WO | WO2013/109881 | 7/2013 |
| WO | WO2014/019780 | 2/2014 |
| WO | WO2014/032023 | 2/2014 |
| WO | WO2014/169253 | 10/2014 |
| WO | WO2015/086459 | 6/2015 |
| WO | WO2016/092278 A1 | 6/2016 |
| WO | WO2016/092778 A1 | 6/2016 |
| WO | WO2016/100075 A1 | 6/2016 |
| WO | WO2016/121331 A1 | 8/2016 |
| WO | WO2016/121332 A1 | 8/2016 |
| WO | WO2016/121347 A1 | 8/2016 |
| WO | WO2019/040809 A1 | 2/2019 |
| WO | WO2019/042679 A1 | 3/2019 |
| WO | WO2019/149682 A1 | 8/2019 |

OTHER PUBLICATIONS

Notice of Allowance dated Nov. 24, 2017 in U.S. Appl. No. 13/456,056.
Office Action dated Jul. 28, 2017 for U.S. Appl. No. 13/456,056.
Notice of Allowance dated Sep. 13, 2017 for U.S. Appl. No. 14/823,969.
Notice of Allowance dated Dec. 7, 2017 for U.S. Appl. No. 14/823,969.
Office Action dated Feb. 7, 2019 in U.S. Appl. No. 15/866,379.
Notice of Allowance dated Oct. 16, 2017 for U.S. Appl. No. 15/219,832.
Notice of Allowance (corrected) dated Feb. 2, 2018 for U.S. Appl. No. 15/219,832.
Office Action dated Jun. 29, 2017 for U.S. Appl. No. 15/219,832.
Office Action dated Jan. 24, 2019 for U.S. Appl. No. 15/868,748.
Notice of Allowance dated May 13, 2019 for U.S. Appl. No. 15/868,748.
U.S. Office Action dated Dec. 21, 2018 for U.S. Appl. No. 14/782,772.
EP Summons to Attend Oral Proceedings dated Feb. 8, 2018 for EP Application No. 13781444.8.
EP Office Action dated Dec. 6, 2018 for EP Application No. 13781444.8.
Extended Supplementary European Search Report dated Apr. 17, 2019 for EP Application No. 19150851.4.
CN Office Action dated Jul. 4, 2017 in CN Application No. 201380025955.6.
CN Office Action dated Mar. 26, 2018 in CN Application No. 201380025955.6.
CN Office Action dated Dec. 18, 2018 in CN Application No. 201380025955.6.
IN Office Action dated Mar. 19, 2019 in IN Application No. 2564/KOLNP/2014.
TW Office Action dated Jun. 20, 2018 in TW Application No. TW 106119450.
European Search Report dated Nov. 7, 2018 for EP Application No. 18182249.5.
TW Office Action dated Jul. 13, 2018 in TW Application No. 107109673.

(56) References Cited

OTHER PUBLICATIONS

TW Decision of Rejection dated Nov. 19, 2018 in TW Application No. 107109673.
European Office Action dated Jan. 18, 2018 for EP Application No. 14782906.3.
International Preliminary Report on Patentability dated Jun. 29, 2017 for PCT/US2015/064942.
U.S. Appl. No. 16/386,094, filed Apr. 16, 2019, Brown et al.
Preliminary Amended dated Apr. 17, 2019 in U.S. Appl. No. 16/386,094.
Preliminary Amendment filed Oct. 5, 2015 in U.S. Appl. No. 14/823,969.
Preliminary Amendment filed Jun. 17, 2016 in U.S. Appl. No. 14/782,772.
Office Action dated Nov. 3, 2014 in U.S. Appl. No. 13/456,056.
Final Office Action dated Jul. 16, 2015 in U.S. Appl. No. 13/456,056.
Office Action dated Feb. 17, 2016 in U.S. Appl. No. 13/456,056.
Final Office Action dated Sep. 21, 2016 in U.S. Appl. No. 13/456,056.
Office Action dated Oct. 6, 2014 in U.S. Appl. No. 13/968,258.
Final Office Action dated Jun. 5, 2015 in U.S. Appl. No. 13/968,258.
Office Action dated Jul. 11, 2013 in U.S. Appl. No. 13/312,057.
Notice of Allowance dated Dec. 13, 2013 in U.S. Appl. No. 13/312,057.
Office Action dated Jan. 30, 2015 in U.S. Appl. No. 14/152,873.
Notice of Allowance dated May 19, 2015 in U.S. Appl. No. 14/152,873.
Office Action dated May 25, 2016 in U.S. Appl. No. 14/823,969.
Final Office Action dated Feb. 21, 2017 in U.S. Appl. No. 14/823,969.
Office Action dated Mar. 31, 2015 in U.S. Appl. No. 14/196,895.
Final Office Action dated Sep. 18, 2015 in U.S. Appl. No. 14/196,895.
Notice of Allowance dated Apr. 21, 2016 in U.S. Appl. No. 14/196,895.
Notice of Allowance dated Jul. 21, 2016 in U.S. Appl. No. 14/196,895.
Notice of Allowance dated Sep. 18, 2013 for U.S. Appl. No. 13/326,168.
Notice of Allowance dated Jun. 13, 2014 for U.S. Appl. No. 14/103,660, and allowed claims.
Notice of Allowance dated Oct. 9, 2014 for U.S. Appl. No. 14/325,290.
Notice of Allowance dated Feb. 25, 2015 for U.S. Appl. No. 14/325,290.
Office Action dated Feb. 4, 2015 for U.S. Appl. No. 14/591,851.
Extended Supplementary European Search Report dated Feb. 16, 2016 for EP Application No. 13781444.8.
Partial Supplementary European Search Report dated Dec. 7, 2015 for EP Application No. 13781444.8.
EP Office Action dated Feb. 23, 2017 for EP Application No. 13781444.8.
CN Office Action dated Oct. 8, 2016 for CN Application No. 201380025955.6.
RU Office Action dated Sep. 19, 2016 in RU Application No. 2014147152.
RU Search Report dated Jan. 19, 2017 in RU Application No. 2014147152.
TW Office Action dated Oct. 25, 2016 in TW Application No. 102114688.
International Preliminary Report on Patentability dated Jun. 11, 2014 for PCT/US2013/037644.
International Search Report and Written Opinion dated Aug. 12, 2013 for PCT/US2013/037644.
European Search Report dated Mar. 3, 2014 for EP Application No. 11846667.1.
EP Office Action dated Nov. 4, 2013 for EP Application No. 11846667.1.
CN Office Action dated Jun. 2, 2015 in CN Application No. 201180058960.8.
CN Office Action dated Mar. 14, 2016 in CN Application No. 201180058960.8.
CN Office Action dated Nov. 16, 2016 in CN Application No. 201180058960.8.
EP Office Action dated May 18, 2016 for EP Application No. 11846667.1.
TW Office Action dated Oct. 15, 2015 in TW Application No. 100145134.
TW Office Action dated Apr. 11, 2017 in TW Application No. 105129376.
International Search Report and Written Opinion dated Jul. 23, 2012, from PCT/US2011/063534.
International Preliminary Report on Patentability dated Jun. 20, 2013, from PCT/US2011/063534.
European Search Report dated Apr. 2, 2015 for EP Application No. 12858168.3.
CN Office Action dated Jun. 3, 2015 in CN Application No. 201280069715.1.
International Preliminary Report on Patentability dated Jun. 26, 2014 from PCT/US2012/068950.
International Search Report and Written Opinion dated Apr. 1, 2013 from PCT/US2012/068950.
International Search Report and Written Opinion dated May 18, 2015 from PCT/US2015/014479.
International Preliminary Report on Patentability dated Mar. 5, 2015 for PCT/US2013/056506.
International Search Report and Written Opinion dated Nov. 22, 2013 for PCT/US2013/056506.
Extended Supplementary European Search Report dated Oct. 11, 2016 for EP Application No. 14782906.3.
European Examination Report dated Jun. 9, 2017 for EP Application No. 14782906.3.
International Preliminary Report on Patentability dated Oct. 22, 2015 for PCT/US2014/033870.
International Search Report and Written Opinion dated Aug. 19, 2014 for PCT/US2014/033870.
International Search Report and Written Opinion dated Apr. 6, 2016 for PCT/US2015/064942.
Ernst, Randi, "Gas Filling of IG Units" by FDR Design, Inc. (undated), 37 pages.
Armstrong, Dave, "Smart, energetic glass could take over" in *Earth Times*, [http://www.earthtimes.org/energy/smart-energetic-glass-take-over/2866/] Apr. 12, 2015.
"'Smart glass' changes colour and produces electricity", ZeeNewsIndia.com [http://zeenews.india.com/news/sci-tech/smart-glass-changes-colour-and-produces-electricity_1577561.html] Apr. 12, 2015.
Burdis et al., "Electrochromic windows: Process and fabrication improvements for lower total costs," SAGE Electronics, Inc., Contract No. De-FC26-03NT41952, Final Report, Technical Report of SciTech Connect, Mar. 31, 2009.
U.S. Office Action dated Aug. 8, 2019 for U.S. Appl. No. 16/386,094.
Office Action dated Sep. 5, 2019 in U.S. Appl. No. 15/866,379.
Notice of Allowance dated Aug. 26, 2019 for U.S. Appl. No. 15/868,748.
U.S. Office Action dated May 12, 2020 for U.S. Appl. No. 16/560,805.
U.S. Final Office Action dated Mar. 18, 2020 in U.S. Appl. No. 16/386,094.
U.S. Notice of Allowance dated Apr. 16, 2020 in U.S. Appl. No. 15/866,379.
Chinese Office Action dated Feb. 6, 2020 in CN Application No. 201710590055.6.
Canadian Office Action dated Apr. 8, 2020 in CA Application No. 2,871,047.
Canadian Office Action dated May 1, 2020 in CA Application No. 2,909,224.
Preliminary Amendment dated Sep. 28, 2020 in U.S. Appl. No. 16/947,046.
U.S. Notice of Allowance dated Aug. 27, 2020 for U.S. Appl. No. 16/560,805.
U.S. Office Action dated Jun. 24, 2020 for U.S. Appl. No. 16/359,945.
U.S. Office Action dated Jul. 29, 2020 in U.S. Appl. No. 16/386,094.
TW Office Action dated Oct. 26, 2020 in TW Application No. 108117502.
U.S. Office Action dated Dec. 1, 2020 in U.S. Appl. No. 16/386,094.
U.S. Appl. No. 17/249,821, filed Mar. 15, 2021, Strong et al.

\* cited by examiner

SEALS FOR ELECTROCHROMIC WINDOWS

CROSS-REFERENCE TO RELATED APPLICATIONS

This application under 35 U.S.C. 371 claims priority to PCT Application No. PCT/US15/64942, filed Dec. 10, 2015, and titled "SEALS FOR ELECTROCHROMIC WINDOWS," which claims benefit of priority to U.S. Provisional Patent Application No. 62/092,188, filed Dec. 15, 2014, and titled "SEALS FOR ELECTROCHROMIC WINDOWS," each of which is herein incorporated by reference in its entirety and for all purposes.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. By way of example, one well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material. In other words, electrochromic windows are windows that can be darkened or lightened electronically. A small voltage applied to an electrochromic (EC) device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960's, electrochromic devices have historically suffered from various problems that have prevented the technology from realizing its full commercial potential.

SUMMARY

Certain embodiments herein relate to methods for fabricating IGUs that are particularly resistant to moisture. Other embodiments relate to moisture-resistant IGUs and structures that may be incorporated into IGUs to promote moisture-resistance. IGUs fabricated according to these methods/structures are more robust and can better withstand humid environments than many conventional IGUs. In one aspect of the embodiments herein, a method is provided for fabricating an insulated glass unit (IGU), the method including providing a partially fabricated IGU including: a first lite and a second lite, at least one of which includes an electrochromic (EC) device and busbars for powering the EC device, wires connected to the busbars, and a spacer positioned between the first lite and the second lite proximate the periphery of each lite; installing a strain relief structure at least partially positioned between the first and second lites; and passing one or more wires through the strain relief structure, where the wires resist strain at a location where the wires meet the IGU.

In certain cases, the strain relief structure has a width that is greater than a distance between the first and second lites. For instance, the width may be at least about 0.05 inches greater than the distance between the first and second lites. In some embodiments, the strain relief structure has a width that is between about 0.5-1.5 inches. The strain relief structure may have a thickness between about 0.1-0.3 inches.

In some embodiments, the strain relief structure is integral with a cable and/or cable sheath. The strain relief structure may include electrical connections for directly connecting to the wires. In various embodiments, the strain relief structure may include a surface that has been roughened or otherwise texturized.

In certain embodiments, the method further includes applying tape to the periphery of the spacer. The strain relief structure may have a particular shape to minimize the risk of moisture entry into the IGU. In some cases, the strain relief structure is shaped such that a shortest route for moisture to travel between (i) the secondary seal where the wires enter the secondary seal and (ii) the tape, includes at least 4 corners. In these or other cases, the strain relief structure may be shaped such that a shortest route for moisture to travel between (i) the secondary seal where the wires enter the secondary seal and (ii) the tape, has a distance of at least about 0.5 inches. Further, in some cases, the strain relief structure is shaped to include a reservoir into which moisture passing through the secondary seal is routed.

In some implementations, the method further includes routing the wires to a single point along the periphery of the partially fabricated IGU, where passing the one or more wires through the strain relief structure includes passing all the wires through the strain relief structure. In certain cases, the method further includes providing a wire bundle coating around the wires after they reach the single point along the periphery of the partially fabricated IGU.

In various cases, the wires are coated with an insulating material that is compatible with material used for the secondary seal. For instance, where the secondary seal is a silicone-based material, the insulting material coating the wires may be silicone, a silicone-based material, and/or a silicone-compatible material. In another embodiment where the secondary seal is a polyurethane-based material, the insulting material coating the wires may be polyurethane, a polyurethane-based material, and/or a polyurethane-compatible material. Similarly, where the secondary seal is a polysulfide-based material, the insulting material coating the wires may be polysulfide, a polysulfide-based material, and/or a polysulfide-compatible material.

Similarly, in certain embodiments, the strain relief structure includes a material that is compatible with material used for the secondary seal. For instance, where the secondary seal is a silicone-based material, the strain relief structure may include silicone, a silicone-based material, and/or a silicone-compatible material. Where the secondary seal is a polyurethane-based material, the strain relief structure may include polyurethane, a polyurethane-based material, and/or a polyurethane-compatible material. Where the secondary seal is a polysulfide-based material, the strain relief structure may include polysulfide, a polysulfide-based material, and/or a polysulfide-compatible material.

The tape may be modified to better bond with the secondary seal material in some embodiments. In some implementations, the tape includes an interior-facing surface that faces the interior of the IGU and an exterior-facing surface opposite the interior-facing surface, where the exterior-facing surface of the tape includes a material compatible with material used for the secondary seal. In some cases, the exterior-facing surface of the tape is roughened or otherwise texturized.

The method may further include providing an additional layer of adhesive between the spacer and the secondary seal, the additional layer of adhesive in direct contact with the secondary seal and including a material that is compatible with the secondary seal. This additional layer of adhesive may be part of the tape in some cases. In other cases this additional layer of adhesive is not part of the tape.

In various embodiments, the partially fabricated IGU further includes primary seal material between the first lite and the spacer, and between the spacer and the second lite. The method may further include applying a secondary seal material between the first and second lite around the perimeter of the partially fabricated IGU.

More than one strain relief device may be installed on a single IGU. In some embodiments, the method may further include installing a second strain relief structure at least partially positioned between the first and second lites, where the second strain relief structure is installed on the same side of the partially fabricated IGU as the strain relief structure; passing one or more wires through the second strain relief structure; and providing tension on the one or more wires such that the wires do not contact the first or second lites. The strain relief structure and/or second strain relief structure may have a particular shape to help maintain the wires where desired during application of the secondary seal material. For example, at least one of the strain relief structure and the second strain relief structure may include a pocket into which the one or more wires are placed and a flexible portion that bends around the one or more wires to help maintain the wires in place in the pocket. In these or other embodiments, the strain relief structure and/or the second strain relief structure that include the pocket and flexible portion further include legs having rounded ends that contact the first and second lites.

In another aspect of the disclosed embodiments, a strain relief structure is provided. The strain relief structure may have a particular shape, may be made of particular materials, and may have certain features as described herein. The strain relief structure may include any of the features as described above in relation to the disclosed methods.

In a further aspect of the disclosed embodiments, an IGU having a strain relief structure is provided. The strain relief structure of the IGU may take any of the forms described herein.

These and other features will be described below with reference to the associated drawings.

DETAILED DESCRIPTION

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiment In order to maintain functionality over long periods of time, electrochromic (EC) devices should be protected from the elements. Otherwise, moisture that comes into contact with an EC device can cause the device to degrade and fail. Often, EC devices are provided in an insulated glass unit (IGU), with seals that are intended to prevent moisture from entering the IGU and reaching the EC device.

An IGU includes two lites separated by a spacer and sealed together with sealant. Electrochromic devices, IGUs, and methods for manufacture thereof are further discussed and described in U.S. patent application Ser. No. 12/645,111, filed Dec. 22, 2009, and titled "FABRICATION OF LOW DEFECTIVITY ELECTROCHROMIC DEVICES," which is herein incorporated by reference in its entirety.

Figure 1A:
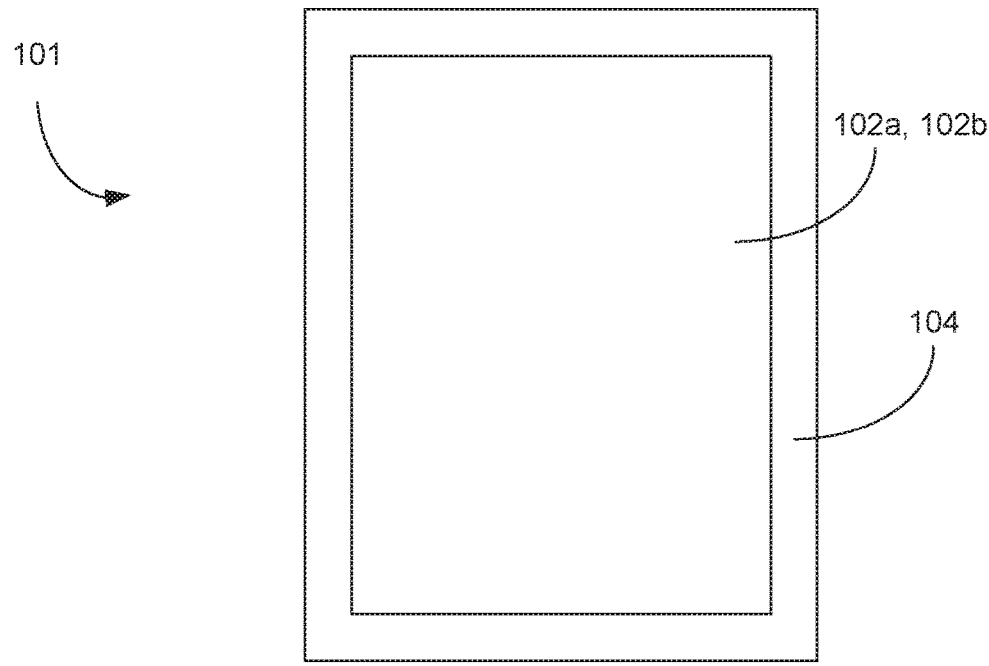
FIG. 1A shows a view of an IGU.
Figure 1B:
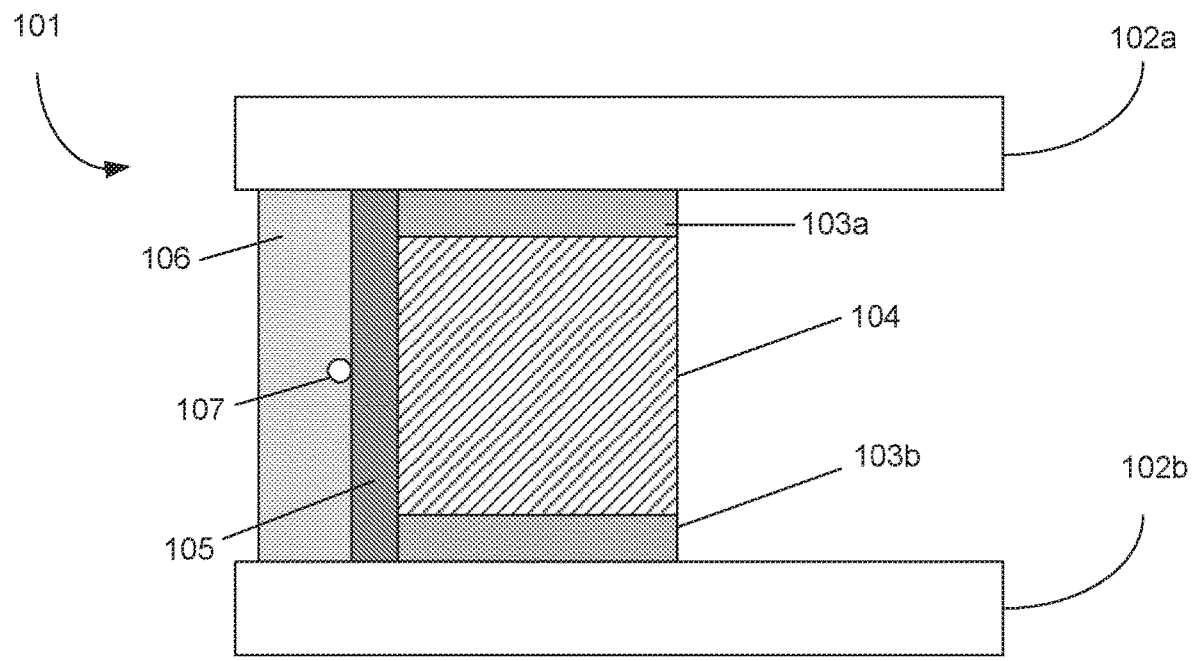
FIG. 1B shows a side view of a portion of an IGU.
Figure 1C:
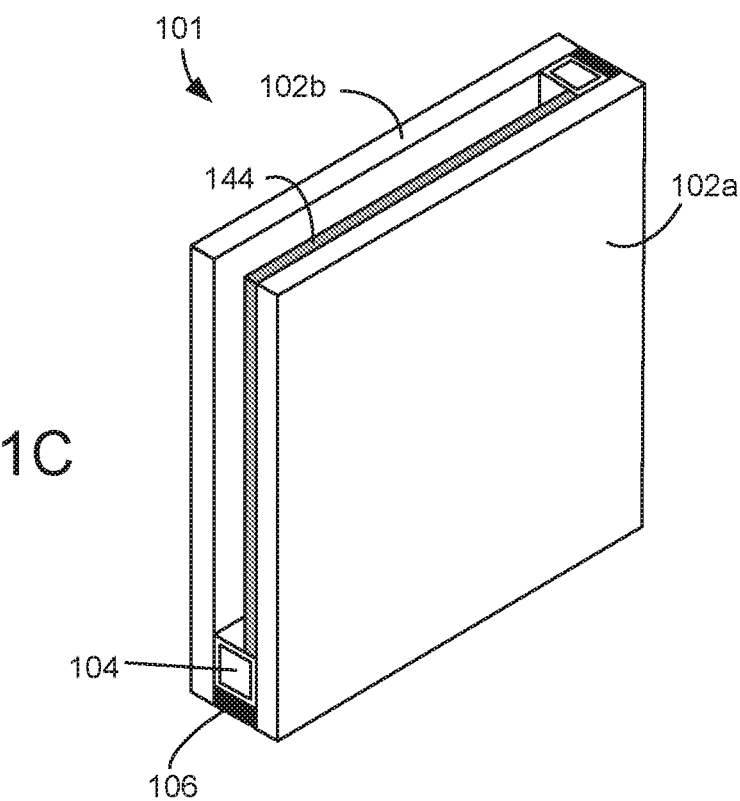
FIGS. 1C and 1D show additional views of an electrochromic IGU.
Figure 1D:
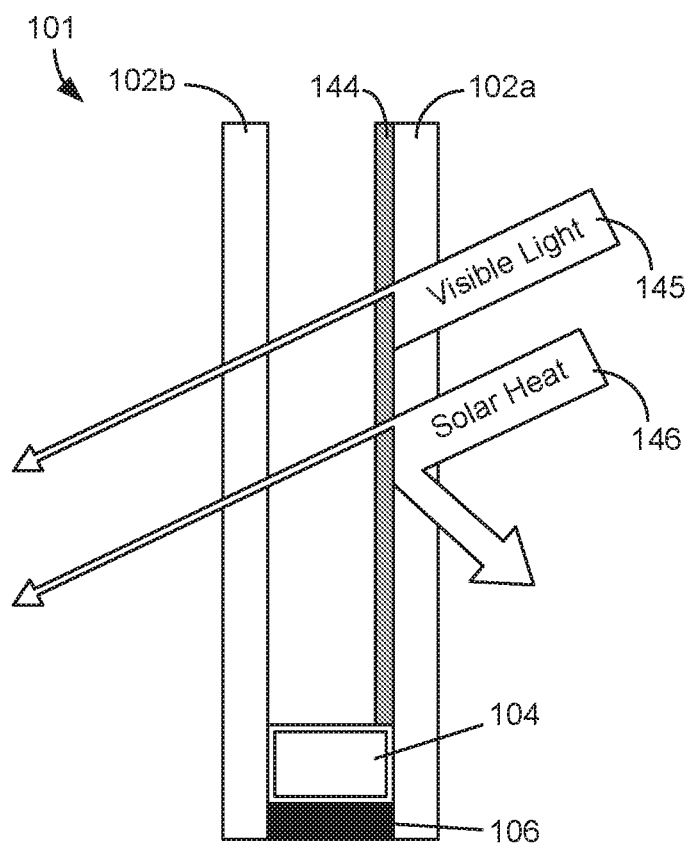

FIGS. 1A-1D illustrate various aspects of electrochromic IGUs. A typical EC window 101 uses an IGU construct, just as a conventional window. The difference is that an EC window 101 has an electrochromic thin film coating 144 on one (or both) lites 102a and 102b of the IGU 101. The EC coating 144 can tint or clear upon application of a small electrical potential applied across the EC coating. When tinted, the EC coated lite (102a in FIGS. 1C and 1D) can block visible light 145 to provide occupant comfort, but also block solar heat gain 146 and therefore reduce cooling burden on HVAC systems, as shown in FIG. 1D. Also, there is no need for conventional shades or window treatments.

FIG. 1A shows an IGU 101 with lites 102a and 102b separated by a spacer 104. FIG. 1B illustrates a cross-sectional view of a portion of an IGU 101. FIGS. 1C and 1D further illustrate the concept of an IGU. In FIGS. 1A, 1C and 1D, certain seals are not shown. Typically, two types of seals are used: a primary seal and a secondary seal. The primary seal (often polyisobutylene, PIB) is applied between the spacer and each lite. This essentially forms a sandwich structure around the perimeter of the IGU, as shown in FIG. 1B. The IGU 101 includes: first lite 102a, first primary seal 103a, spacer 104, second primary seal 103b, and second lite 102b. At least one of the first lite 102a and second lite 102b include an EC device thereon. Positioned outside of the spacer is often a piece of tape 105 (e.g., mylar tape) that may wrap around the perimeter of the spacer 104. This tape 105 helps retain the argon (or other gas) inside the interior of the IGU. Outside of the tape 105, a secondary seal 106 (often a silicone-based material, a polyurethane-based material, or a polysulfide-based material) is provided around the perimeter of the IGU 101. In some cases the secondary seal material is provided by Dow Corning of Midland, Mich. The primary seals 102*a* and 102*b*, tape 105, and secondary seal 106 all help prevent moisture from entering the interior region of the IGU.

One important consideration when designing electrochromic windows is how to provide power to the EC device to drive the optical transitions. In various designs, two bus bars are positioned on opposite sides of a lite in an IGU. Wiring is connected near the center portion of each bus bar. Each wire typically includes an insulating coating. The wiring may feed through or under the spacer, and through or under the tape. As shown in FIG. 1B, the wiring 107 may then feed around the perimeter of the IGU 101, outside of the tape 105, to bring the two wires 107 to a single common point. Strips of tape (not shown, e.g., mylar tape) or other adhesive (e.g., dabs of silicone, glue, etc.) may be provided along the length of the wires 107 to help keep them in place. After the wires 107 are routed to a single point, a layer of insulation may be provided around the wires (e.g., each wire may be individually insulated along its length, and an additional layer of insulation (referred to as wire bundle coating) may be provided around both wires (or all wires, if more than two are present) starting at the point where the wires meet one another). The secondary sealant 106 is provided around the wires 107/tape 105/spacer 104.

The primary/secondary seal configuration shown in FIG. 1B works well to keep moisture out of non-electrochromic IGUs that do not include wiring passing through the seals. However, in various implementations where wiring passes through the seals, this seal configuration, depending on the handling, may eventually result in moisture ingress into the interior of the IGU. It is believed that moisture enters the IGU at the point where the wires traverse the secondary seal. That is, the seal between the wires and the secondary sealant is somehow compromised during handling, and/or as a result of failure of the seal between the wires' insulation and the secondary sealant adhesive. As mentioned above, the secondary seal is often a silicone-based, polyurethane-based and/or polysulfide-based material. In certain embodiments, the secondary seal is a fast-setting silicone material that cures, e.g., in about 24 hours.

It is often the case, however, that the IGUs are handled only a few hours after applying the secondary seal. This early handling facilitates fabrication of the IGUs and increases throughput. However, the early handling may contribute to a less-than-water-tight seal between the secondary seal and the wires and/or tape as described. For instance, the wires may be tugged/pulled/jiggled while the IGU is handled, which may compromise the secondary seal's adhesion to the wires' insulation and/or the tape around the spacer. Another possibility is that the adhesion between the secondary seal and the wires and/or tape may degrade over time, even if the seal forms perfectly when first manufactured.

Due to some compromise of the adhesion between the wire insulation and the secondary sealant, moisture enters through the secondary seal and may travel along the wires to the tape. When moisture reaches the tape, it is wicked along the tape around the perimeter of the IGU. From there, the moisture will attack and may penetrate through the primary seal at any weak point in the seal. In effect, the tape creates a path for moisture to travel from the point at which it first penetrates the secondary seal, to any and all points along the perimeter where the primary seal is less than perfect, and can promote further degradation of these sensitive areas. When moisture breaches the primary seal, the EC device may have degraded performance, or in many cases may stop working entirely. For instance, moisture that reaches the active device area can cause corrosion and delamination of the EC device.

Embodiments herein provide a number of ways to help minimize the risk that moisture enters the interior of the IGU. In certain cases, a structure (referred to as a strain relief structure) may be provided to reduce the degree of strain on the wires. Typically, the structure helps hold the wires in place, e.g. where the wires meet one another and pass through the secondary seal. The strain relief structure may be placed between panes of the IGU, and the secondary sealant may be applied over the strain relief structure to seal the strain relief structure into the IGU. During fabrication, the IGU may be handled a few hours after application of the secondary seal, while the secondary seal is still curing. The strain relief structure helps minimize movement of the wires that occurs during (and after) handling, thereby maintaining the integrity of the adhesion between the secondary seal and the wires and/or tape.

Figure 2A:
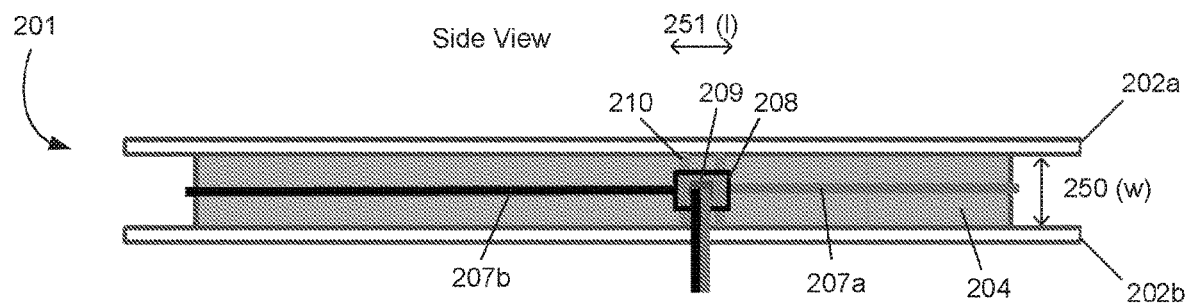
FIGS. 2A and 2B illustrate an embodiment of an IGU including a strain relief structure.
Figure 2B:
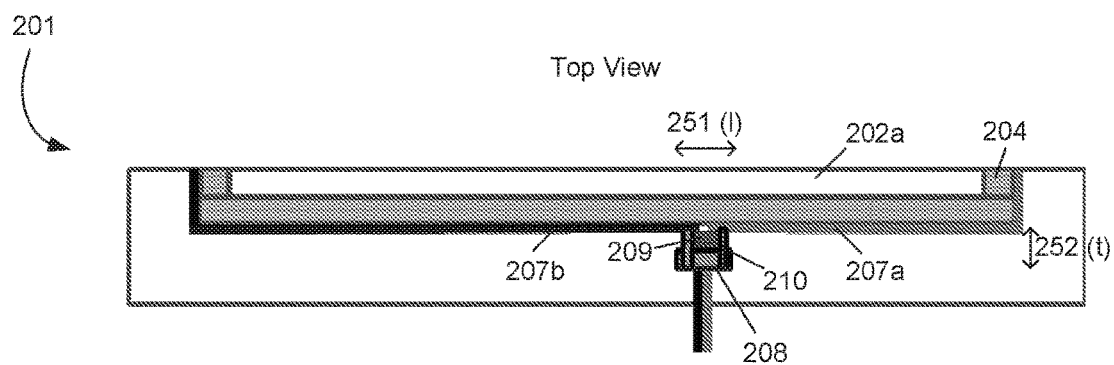

FIGS. 2A and 2B show an embodiment of an IGU 201 that includes a strain relief structure 208. A spacer 204 sits between two lites 202*a* and 202*b*, at least one of which includes an electrochromic device. The tape, which surrounds the spacer 204, is not shown. The busbar wires 207*a* and 207*b* connect to the busbars and extend around the perimeter of the IGU and meet, e.g., at a central location, as shown. The busbar wires 207*a* and 207*b* may connect to the busbars at or near the center of each busbar in certain cases. The central location at which the busbar wires 207*a* and 207*b* meet may be at any location along the periphery of the IGU 201. The wires each include an insulating coating. Where the wires 207*a* and 207*b* meet, a wire bundle coating (not shown) may be provided around the wires to help keep the wires together. Also where the wires 207*a* and 207*b* meet, the wires pass through the strain relief structure 208. Epoxy or other sealant 209 is provided around the wires 207*a* and 207*b*, inside the strain relief structure 208. The material chosen for the epoxy or other sealant 209 should bond very well to the wires 207*a* and 207*b* (e.g., the insulating coating around the wires or wire bundle) and to the material of the strain relief structure 208, and should also provide a good moisture seal. In some cases the sealant is the same sealing material used for the secondary seal (e.g., a silicone- or polyurethane-based material). In other cases, the epoxy or other sealant is hot glue, fast setting epoxy (e.g., 2-part epoxy), or ethylene propylene diene monomer rubber (EPDM). This epoxy or other sealant 209 (as well as the strain relief structure 208) helps stabilize the wires so that they are less likely to move when their ends are tugged or jiggled. The epoxy or other sealant 209 also provides an additional barrier to prevent moisture from entering the IGU along the wires. In some embodiments this epoxy or other sealant is omitted.

The strain relief structure 208 seals around the wires with a strong, moisture tight and durable seal. One function of the strain relief structure is to increase the cross sectional area orthogonal to the wire path, to provided added strain relief for the wires. This strain relief reduces the possibility of forming of a moisture path through the secondary seal or between the secondary seal and the wires/tape, at least because the wires are much less likely to shift around while the secondary seal is curing. In some cases, the cross-sectional area of the strain relief structure is between about 0.125 $in^2$-1.5 $in^2$, or for example between about 0.25 $in^2$-1.0 $in^2$ and in one embodiment, between about 0.25 $in^2$-0.5 $in^2$ (measured on the cross section shown in FIG. 2A, including any tabs 210 as well as any area occupied by epoxy or other sealant 209).

Returning to the embodiments of FIGS. 2A and 2B, the strain relief structure 208 includes vertical tabs 210 designed to hold the strain relief structure 208 between the lites 202a and 202b. The tabs 210 may be configured to be slightly bigger than the distance between the lites 202a and 202b such that the strain relief structure 208 can be securely wedged into the available space. The tabs 210 should not be so big, or the material of the structure so rigid, so as to cause substantial strain on the lites 202a and 202b. For example, the strain relief structure may be made of silicone, e.g., that is flexible and can deform while still maintaining compressive force against the glass substrates of the IGU, and thus hold the wires in place. In certain embodiments these tabs are omitted. In some cases, for example, the entire strain relief structure may be shaped to wedge into the space between the lites of the IGU (one example is a block-shaped structure that is very slightly thicker than the distance between the lites). In various embodiments herein, the strain relief structure is defined to have a width (w) in direction 250, a length (l) in direction 251, and a thickness (t) in direction 252. The strain relief structure may have a width between about 0.3-1.0 inches. This width may correspond to a width that is between about 0.05-0.25 inches greater than the distance between the lites 202a and 202b. The strain relief structure may have a length between about 0.25-5 inches, for example between about 0.5-1.5 inches. The strain relief structure may have a thickness between about 0.1-0.75 inches, for example between about 0.2-0.5 inches. Of course, other dimensions may be used in various designs.

Figure 8:
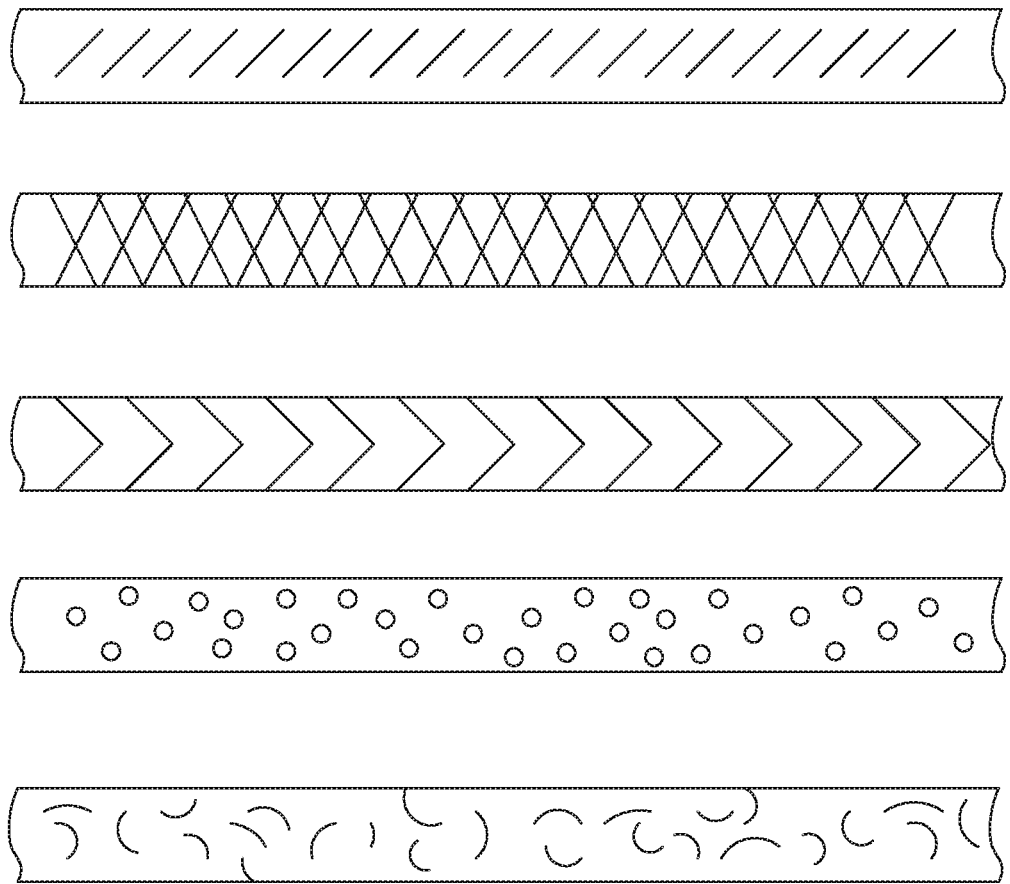
FIG. 8 depicts various textures that may be added to certain surfaces in some embodiments herein.

In some cases, the strain relief structure may be texturized/roughened to make it more difficult to remove the structure after it is placed between lites of the IGU, as explained further in relation to FIG. 8. For example, the strain relief structure may include chevrons on the surfaces that mate with the lites of the IGU. These chevrons are configured to make it easier to insert the structure between the substrates of the IGU than it is to remove from between the substrates.

After the strain relief structure is installed, the secondary seal is applied. The strain relief structure may be fully or partially encased in the secondary seal material. In certain embodiments, the material used to fabricate the strain relief block is chosen such that it bonds well to the secondary seal material. In various embodiments the material of the strain relief block is silicone, polyurethane, a silicone-based material, a polyurethane-based material, a silicone-compatible material, or a polyurethane-compatible material. A material that is silicone- or polyurethane-compatible is one that is capable of forming a strong, water-tight bond to the silicone or polyurethane, respectively, without degrading either material in a way that would compromise the bond between them. In certain other cases, the strain relief block may be made of polysulfide, polystyrene, polyester, acrylic, nylon, polyvinylidene fluoride (PVDF), or thermoplastics such as polyethylene, polypropylene, or polystyrene.

Figure 3:
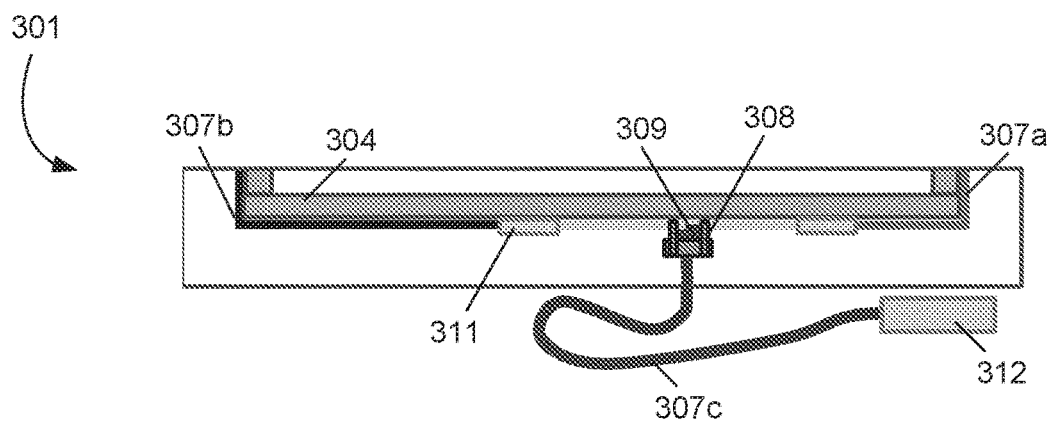
FIG. 3 illustrates an alternative embodiment of an IGU including a strain relief structure.

FIG. 3 presents another embodiment of an IGU 301 with a strain relief structure 308. In this embodiment, the wires 307a and 307b stop before reaching a single central location. Additional wiring, often referred to as a pigtail 307c, connects to the strain relief block 308. The pigtail 307c includes cable/wires surrounded by a sheath, and often ends in a connector 312 for use with a control system. The sheath around the pigtail 307c may be secured and sealed in the strain relief structure 308. The wires within the sheath may continue through the strain relief structure 308 before bending in either direction, as shown. These wires may be soldered, crimped, or otherwise connected to wires 207a and 207b using appropriate connectors 311. In some embodiments, the sheath may be integral with the strain relief structure 308, to further prevent moisture from entering the IGU. For instance, the sheath of the pigtail 307c and the strain relief structure 308 may form a single piece. The secondary seal (not shown) is provided around the spacer 304/wires 307a and 307b/connectors 311/strain relief structure 308. The strain relief structure 308 may be positioned wholly or partially in the secondary seal. In some cases, the strain relief structure 308 is positioned wholly in the secondary seal such that the sheath on the pigtail 307c is partially embedded in the secondary seal. In such an embodiment, the secondary seal may directly seal to a portion of the sheath of the pigtail 307c.

Figure 4:
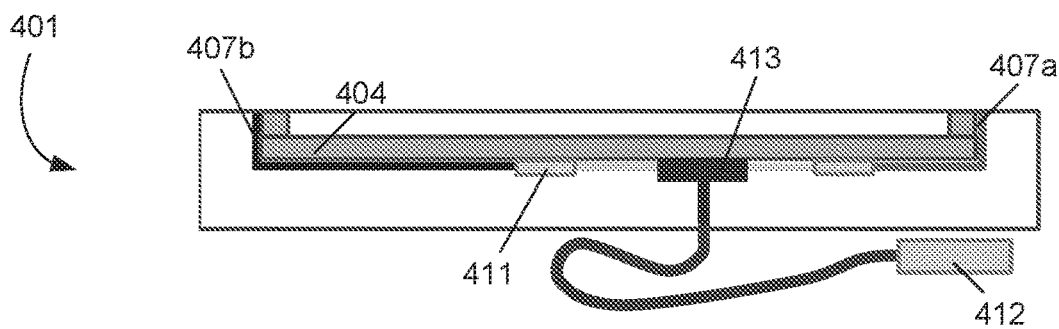
FIG. 4 depicts an embodiment of an IGU including a strain relief structure that is integral with a pigtail.

FIG. 4 provides another embodiment of an IGU 401 that includes a strain relief structure 413. This embodiment is similar to that shown in FIG. 3. Here, the strain relief structure 413 is integrated with the pigtail. For example, the wires in the pigtail are embedded in an insulation material, the insulation material has a unitary body, e.g. injection molded, that covers the wires and forms the strain relief structure. In one embodiment, the pigtail includes a memory device as described in U.S. patent application Ser. No. 13/049,756, filed Mar. 16, 2011, and titled "MULTIPURPOSE CONTROLLER FOR MULTISTATE WINDOWS," which is herein incorporated by reference in its entirety. That is, the pig tail is an injection molded structure having wires for connecting to the bus bar wires and a memory, e.g. a chip, which can be programmed with characteristics of the EC device of the IGU to which it is/will be attached. In one embodiment, again describing a unitary structure, the strain relief structure includes a sleeve portion and a strain relief portion, and the unitary body encompassing both portions is e.g., injection molded. The wires of the IGU have their own insulation. The wires are inserted into the sleeve portion and a sealant is used to form a hermetic seal between the inside of the sleeve portion and the insulation on the wires of the IGU. The strain relief structure may include a memory as described above.

Wires travel from the connector 412, through the pigtail, and turn 90° within the strain relief structure 413. The wires can then be soldered, crimped, graphed by a spring or clamp connection, or otherwise connected to connectors 411 to electrically connect with the wires 407a and 407b. In the embodiment of FIG. 4, the strain relief structure 413 has a block-shaped portion that fits/wedges between the lites of the IGU 401, for example against the spacer 404 or tape (not shown). Using the dimensions as defined in relation to FIGS. 2A and 2B, the block of the strain relief structure 413 that fits between the lites may have width as described above, a length between about 0.25-6.0 inches, for example between about 0.5-3.0 inches, and a thickness between about 0.1-3.0 inches. For example between about 0.2-1.0 inches (counting the thickness of the entire block portion, even if it extends past the edges of the lites). The region where the pigtail sheath meets the block portion of the strain relief structure may be reinforced to provide extra strain relief for the wires.

As described above, the secondary seal may be provided around the perimeter of the IGU. The block portion of the strain relief structure 413, which sits between the lites, may reside wholly or partially within the secondary seal. In a similar embodiment, the block-shaped portion of the strain relief structure 413 may have a slightly modified shape that makes it more difficult to move/remove the block after it is inserted between the lites. For instance, the end portions of the block may be relatively taller than the central portion of the block (or vice versa). Similarly, the block may be texturized to make it less likely that the strain relief structure 408 moves after being positioned between the lites, as shown in FIG. 8 below.

Figure 5:
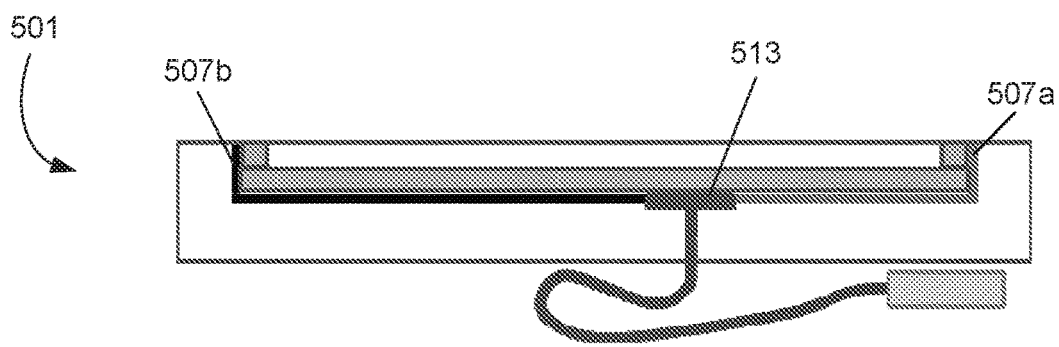
FIG. 5 shows an embodiment of an IGU including a strain relief structure into which the busbar wires can directly feed.

FIG. 5 presents an embodiment of an IGU 501 similar to the IGU 401 shown in FIG. 4. Only the differences will be described. In this embodiment, the wires 507*a* and 507*b* are fed directly into the strain relief structure 513. The strain relief structure 513 includes components (e.g., tabs, sockets, springs, clamps, conductive adhesive, pads, etc.) for electrically connecting to wires 507*a* and 507*b*. The strain relief structure 513 may be made of multiple pieces in these embodiments, e.g., piece(s) for providing electrical connections, piece(s) for providing insulation, and piece(s) for shaping the strain relief structure 513 to fit between lites of the IGU 501. Certain pieces may provide more than one such function. In this embodiment, the wires connected to the busbars of the IGU can be stripped (to remove their insulating coating) and connected directly to the strain relief structure.

Figure 6:
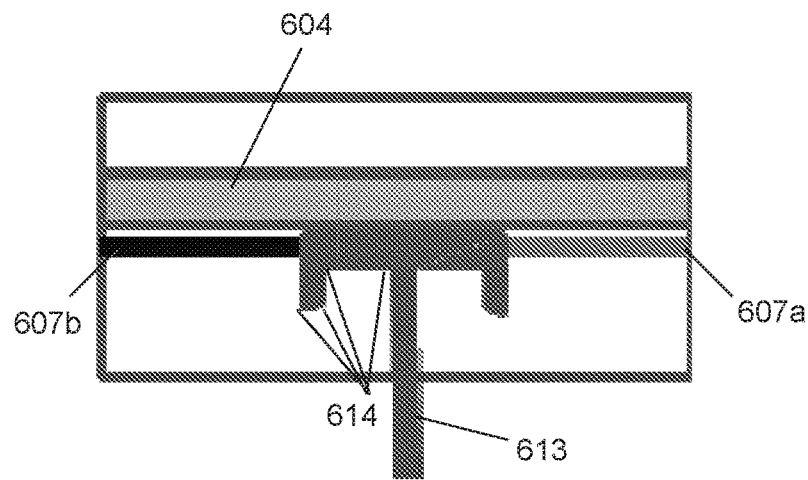
FIG. 6 illustrates an embodiment of a strain relief structure that includes a circuitous route for moisture to travel.

FIG. 6 illustrates an embodiment of a strain relief structure 601 that is configured to provide a circuitous route for moisture entering the IGU. This type of feature may be used in any of the disclosed embodiments. In this design, water that enters along the integrated pigtail/strain relief structure 613 travels over a relatively long route, with several turns, before reaching the spacer 604/tape (not shown). In some cases, the strain relief structure 613 is shaped such that any moisture that reaches the strain relief structure 613 is routed into one or more reservoir/tubs before reaching the spacer 604/tape. This circuitous route, along with any reservoirs present, can help minimize the likelihood that moisture reaches the interior region of the IGU. In some cases, the strain relief structure is shaped to include several corners (e.g., at least about 4 corners, at least about 6 corners, at least about 10 corners, etc.) that moisture would need to round before reaching the spacer/tape. In the embodiment of FIG. 6, for instance, moisture needs to round four corners 614 before reaching the spacer/tape. In these or other cases, the strain relief structure may be shaped to provide a long pathway for moisture to travel before reaching the spacer/tape. For example, in some cases the shortest distance for a surface path for moisture to travel between (i) the surface of the wires/pigtail/sheath/etc. where the wires first enter the secondary seal from outside the IGU and (ii) the tape, is between about 0.25-1.5 inches, for example between about 0.5-0.75 inches. Such strain relief structure designs may also advantageously increase the strain relief provided by the structure, for example by increasing the cross-sectional area of the structure.

One advantage of various disclosed embodiments utilizing a strain relief structure is that the structure can help secure the wires in place while the secondary seal is being applied. In conventional fabrication methods, the wires are secured through strips of mylar tape, which may further contribute to a poor seal between the secondary seal and the wires/tape/spacer. The strain relief structure may eliminate the need to provide such strips of mylar tape to hold the wires in place, thereby reducing the risk of forming pathways in the seal that could be used to transport moisture into the IGU.

Another technique for reducing the likelihood of moisture entering the interior region of the IGU is to use an improved material for insulating the wires. The improved material may be one that is more chemically compatible with the secondary seal material, thereby adhering better to the secondary seal. A more secure bond between the insulating coating on the wires and the secondary seal material reduces the likelihood that moisture can enter the IGU.

As mentioned above, the wires are often routed to a central location, and may include individual insulating coatings, as well as an (optional) insulating wire bundle coating surrounding both (or all) wires after they join together. In certain embodiments, the coating provided around each wire, and/or the wire bundle coating may be made of a material that bonds particularly well to the material used for the secondary seal. For instance, where the secondary seal is silicone, the individual wire coatings and/or the wire bundle coating may be made of silicone, a silicone-based material, or a silicone-compatible material. Similarly, where the secondary seal is polyurethane, the individual wire coatings and/or wire bundle coating may be made of polyurethane, a polyurethane-based material, or a polyurethane-compatible material. In certain examples, one or more of the wire coatings are made of polyvinyl chloride, polyethylene, polyurethane, polyvinylidene fluoride, Teflon, modified polyphenylene ether (MPPE), neoprene, kyvar, ethylene propylene diene monomer rubber (EPDM), nylon, or a combination thereof. In certain cases the material of the wire coatings is cross-linked. One particular example is cross-linked polyethylene, though other cross-linked materials may also be used. These coatings may also take a form of two layers, where the inner layer is a different composition than the outer jacket material. The inner and outer layers may be chosen from the materials listed above in some cases.

In one embodiment, the wire bundle coating is omitted, but the individual wire coatings are made of a material that bonds particularly well to the secondary seal, as described. In another embodiment, the wire bundle coating is included, and is made of a material that bonds particularly well to the secondary seal, as described. In this case, the individual wire coatings may also be made of a strongly bonding material, or they may be a more conventional wire coating.

The material used for the insulating coatings should provide a good moisture seal. The bond between the secondary seal and the insulating coatings may be formed through normal application of the secondary seal (e.g., curing), or it may be formed/enhanced through exposure to the secondary seal solvent, exposure to another type of solvent (e.g., a cleaning solvent such as acetone, IPA, ethanol, etc.), exposure to a primer (e.g., Dow Corning CLR 309 G) provided to the coatings, or by exposure (e.g., localized exposure in some cases) to heat and/or plasma. The coatings may be applied to a thickness between about 0.01-0.1 inches in some cases. Further, the insulating coatings may be roughened/texturized to help form a more secure bond between the coatings and the secondary seal. Advantageously, an improved insulating coating on the wires will help reduce the strain on the wires during and after fabrication, since it is less likely that any tugging/jiggling of the wires is transferred through the wires along the secondary seal. This helps minimize the risk of forming pathways through which moisture can travel upon breaching the secondary seal.

An additional technique for mitigating moisture entry into the IGU is to provide an additional layer to better bond the spacer or tape (when present) to the secondary seal. This layer may be provided separately, or it may be integrated into the spacer or tape itself. In some cases, this layer has a thickness between about 0.001-0.2 inches, for example between about 0.01-0.05 inches. In various conventional applications, the tape includes a single adhesive side that faces toward the interior of the IGU, and the surface of the spacer is not specially treated to promote secondary seal adhesion. The other side of the tape is typically non-adhesive, and has been shown to undesirably wick moisture such that the moisture is distributed around the perimeter of the IGU, interior of the secondary seal. As such, in certain embodiments, this outward-facing side of the spacer or tape is modified to include a material that bonds particularly well with the secondary seal. This may be accomplished through application of a primer to the unmodified spacer or tape surface in some cases. Alternatively or in addition, the outward-facing side of the spacer and/or tape can be modified to be rougher such that any seal that forms to this surface has greater integrity. Such texturing is described further in relation to FIG. 8.

Similar to the embodiments described above, where the secondary seal is silicone, the additional layer that bonds the tape or spacer to the secondary seal may be silicone, a silicone-based material, or a silicone-compatible material. Where the secondary seal is polyurethane, the additional layer that bonds the tape or spacer to the secondary seal may be polyurethane, a polyurethane-based material, or a polyurethane-compatible material. As noted, this layer may be provided separately, or it may be integrated with the tape itself (essentially forming a double sided tape). Whatever material is chosen, it should bond very well to the material used for the secondary seal and to the tape (where present) or spacer (where no tape is present between the secondary seal and the spacer).

Figure 7:
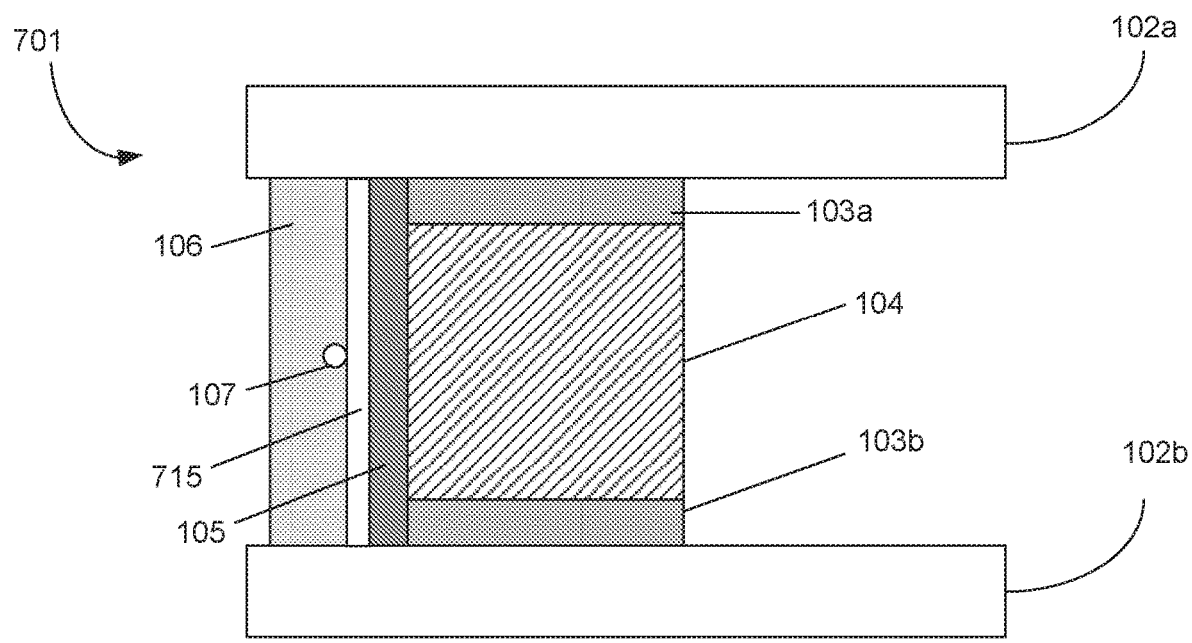
FIG. 7 illustrates an embodiment of an IGU including an additional layer between the tape and the secondary seal.

FIG. 7 illustrates an embodiment of an IGU 701 similar to that shown in FIG. 1B, with an additional layer of material 715 between the tape 105 and the secondary seal 106. The remaining portions of FIG. 7 are identical to FIG. 1B and will not be described. The additional layer of material 715 may be part of the tape 105, or it may be separate.

Various embodiments herein have been described in the context of an IGU that includes a secondary seal made of a silicone- or polyurethane-based material. Other materials may also be used for the secondary seal, as appropriate. In such cases, any materials described herein as being, e.g., silicone-compatible or polyurethane-compatible, should instead be compatible with the material chosen for the secondary seal. In some cases, the secondary seal is a silicone-based material that includes a certain degree of solids (e.g., carbon, etc.) added to the silicone. The solids make the material more rigid after they are cured. Such rigidity is beneficial in terms of providing extra stability to the IGU. However, such rigidity may not be desired in a material used to bond to this layer. Instead, it may be desired to use a bonding material that is more flexible.

As such, in some embodiments, materials described herein as silicone-based or silicone-compatible may be the same silicone-based material used for the secondary seal, but without (or with fewer) additives that would increase the rigidity of the material upon curing. This material may have a lower molecular weight than the material used for the secondary seal. In certain embodiments, a silicone-based material has an average molecular weight between about 30 amu-500 amu, for example between about 35-100 amu. In these or other cases, the silicone-based material may have an average molecular weight of about 500 amu or less, for example about 100 amu or less.

As noted above, various surfaces may be texturized/roughened such that the seal that forms on such surface has greater integrity. The rough surface provides additional surface area on which the bond forms. FIG. 8 illustrates various examples of textures that may be applied to various surfaces (e.g., insulating wire coatings, tape, strain relief structure, etc.) to promote improved adhesion. These textures are intended to be illustrative and not limiting. One of skill in the art would understand that many texturing designs/techniques may be used.

Another issue that sometimes arises during fabrication of electrochromic IGUs is undesired contact between the glass lites of the IGU and wires routed around the perimeter the IGU. With respect to FIG. 1B, for example, wire 107 may not be centered between the lites 102a and 102b at all points around the perimeter of the IGU 101. The wire 107 may come into contact with one or both of the lites 102a and 102b at various points around the IGU 101. This contact is undesired because the wire 107 is more likely to be visible to a user/occupant where the wires contact the lites 102a and/or 102b, as opposed to where the wires are embedded in the secondary seal 106 or otherwise positioned without contacting the lites 102a or 102b. As noted above, in some processing methods, small strips of tape (not shown) are sometimes used to hold the wires 107 in place, centered between the lites 102a and 102b, during application of the secondary seal 106. In some cases, these strips of tape are carefully applied to resist forming voids proximate the secondary seal, into which moisture could undesirably penetrate.

Figure 9A:
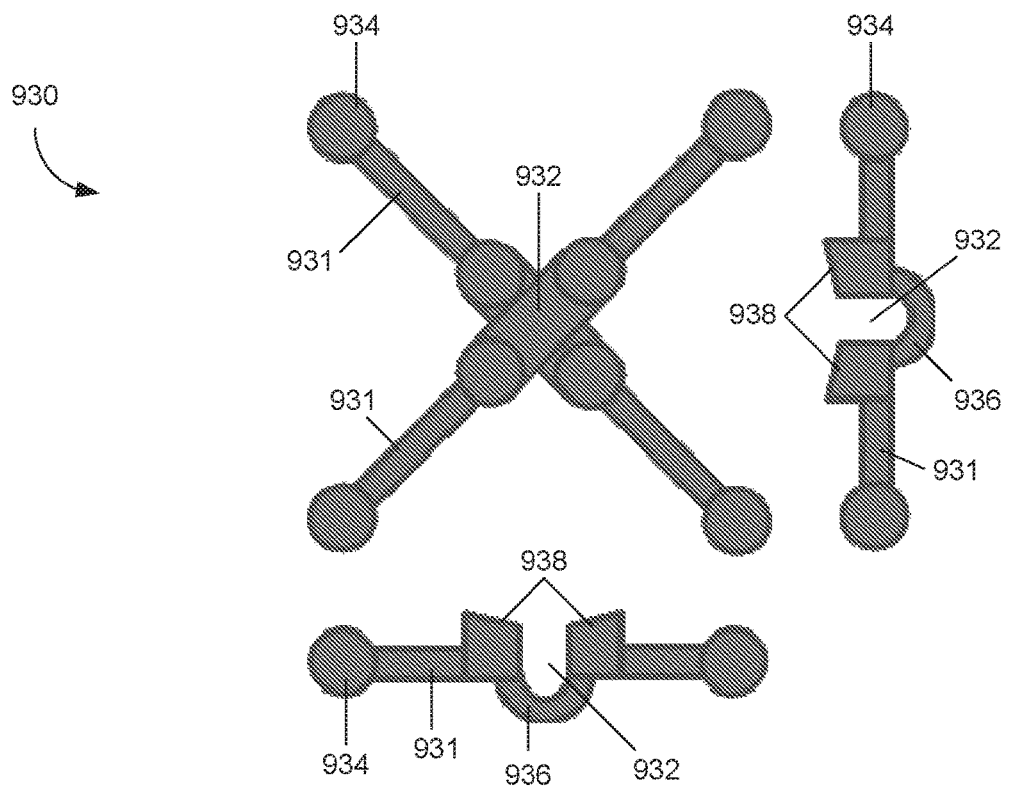
FIGS. 9A-9C illustrate a strain relief structure/wire centering structure according to some embodiments.
Figures 9B, 9C:
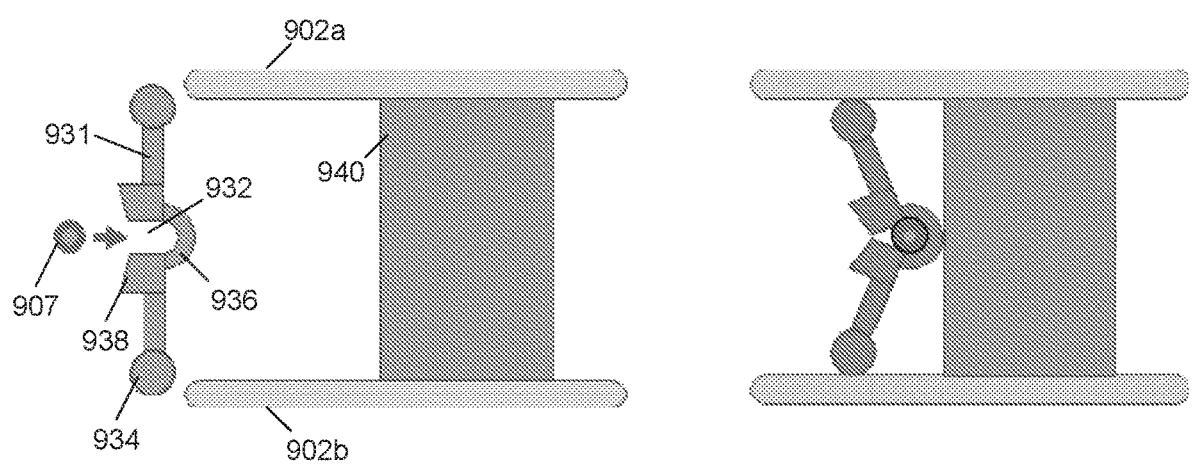

FIG. 9A illustrates three views of a wire centering structure 930 (also referred to as a clip) that may be used in various embodiments to help hold the wires in place during application of the secondary seal. FIG. 9B illustrates a wire 907 being placed into the wire centering structure 930, and FIG. 9C shows the wire 907 in the wire centering structure 930 installed between the lites 902a and 902b. Reference numerals are omitted from FIG. 9C for the sake of clarity. In this example, the wire centering structure 930 includes four legs 931 offset from one another in an x-shape. The end of each leg 931 includes a rounded portion 934 that comes into contact with the lites. In FIGS. 9A-9C, each wire centering structure 930 includes four rounded ends 934, with two such rounded ends 934 to be placed into contact with each lite. Different numbers of legs/rounded ends can be used in other embodiments. One or more wires can be placed into the pocket 932 formed at the center of the wire centering structure 930. When positioned between lites as shown in FIGS. 9B and 9C, for instance, flexible portion 936 allows the legs 931 to bend toward one another and close off the pocket 932 to retain the wire within. Blocks 938 may close around the periphery of the wire, or a portion thereof, to help maintain the wires in place. The blocks 938 or other structure proximate the pocket 932 may be sloped, as shown, to facilitate insertion of the wire 907 into the wire centering structure 930. The flexible portion 936 may come into contact with a surface 940 positioned between the lites 902a and 902b. The surface 940 may be a spacer, tape (e.g., mylar tape), or an additional adhesive/sealant material such as layer 715 in FIG. 7, for example. Various other details regarding the IGU (e.g., primary seals, details of spacer, tape, etc.) are omitted in FIGS. 9B and 9C.

The wire centering structure 930 may be made of a semi-flexible material. In some cases, the flexible portion 936 is made of a flexible or semi-flexible material, while the legs 931 may be made of a different material. Example materials that may be used for the wire centering structure 930 in certain embodiments include, but are not limited to, materials described herein as appropriate for a strain relief structure, plastic, rubber, etc. The portion of the structure that contacts the wires (e.g., the inside of pocket 932 and certain surfaces of blocks 938) may be made of a material that exhibits substantial friction against the wires to help maintain the wires in place. The wire centering structure 930 may be dark colored, for example black, in certain embodiments. Both the small rounded ends 934 and dark color can help reduce the visibility of the wire centering structure in a finished IGU. In various cases, the wire centering structure 930 may be designed to bend around the wire, and to be supported through tension between the lites 902a and 902b, as shown in FIG. 9C. The tension helps hold both the wire centering structure 930 and the wire 907 in place during application of the secondary seal.

In certain embodiments, one or more wire centering structures are provided between the lites of the IGU. For example, one or more wire centering structures (e.g., two or more) may be provided on a side of the IGU. In various embodiments, the IGU may include 1-4 sides that each include one or more (e.g., two or more) wire centering structures. Larger IGUs may benefit from additional numbers of wire centering structures on each side.

Returning to the embodiment of FIGS. 9A-9C, different methods may be used to install the wire centering structure between the lites. In some cases, wire is placed into the pocket 932, and tension applied to the wire effectively snaps the wire centering structure into place between lites 902a and 902b. In other cases, a tool may be used to push and/or pull the wire centering structure 930 into place. Advantageously, the bending of the wire centering structure 930 around the wire 907 provides a grip to help hold the wire 907 in the wire centering structure 930. Further, tension of the wire centering structure 930 against the lites 902a and 902b helps hold the wire centering structure 930 in place. This configuration may be used to ensure that the wires 907 remain centered between the lites 902a and 902b such that the wires do not contact the lites at any point along the periphery of the IGU.

One advantage of the disclosed wire centering structure is that in various embodiments, the structure does not include a planar surface that would obstruct flow of the secondary seal material as it is applied. The disclosed wire centering structure has an open framework, allowing the secondary seal material to easily flow around the structure to form a more complete seal.

The wire centering structure shown in FIGS. 9A-9C may function as a strain relief structure, providing many of the other benefits disclosed herein in relation to other strain relief structures. As used herein, wires positioned in a pocket of a wire centering structure are considered to pass through a strain relief structure.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof.

What is claimed is:

1. A method for fabricating an insulated glass unit (IGU), the method comprising:
providing a partially fabricated IGU comprising:
a first lite and a second lite, at least one of which comprises an electrochromic (EC) device and busbars for powering the EC device,
one or more wires for delivering power to the busbars,
a spacer positioned between the first lite and the second lite proximate the periphery of each lite, and
a primary seal positioned between the spacer and the first lite, and between the spacer and the second lite;
inserting a first strain relief structure between the first and second lites, the first strain relief structure being deformable and having a pocket that at least partially surrounds the one or more wires; and
providing a secondary seal around the spacer and between the first lite and the second lite, the secondary seal being separate from the first strain relief structure,
wherein the first strain relief structure is positioned along a first side of the IGU and extends along only a portion of the first side of the IGU,
wherein the first strain relief structure has a width that is at least about 0.05 inches greater than a distance between the first lite and the second lite, the width being measured in a direction between the first lite and the second lite, and
wherein the first strain relief structure exerts a compressive force on the first lite and the second lite after the IGU is fabricated.

2. The method of claim 1, further comprising:
installing a second strain relief structure; and
passing the one or more wires through the second strain relief structure.

3. The method of claim 2, wherein the second strain relief structure is shaped to include a reservoir into which moisture passing through the secondary seal is routed.

4. The method of claim 2, wherein the first strain relief structure and the second strain relief structure are both positioned along the first side of the IGU.

5. The method of claim 1, wherein the width of the first strain relief structure is between about 0.3-1 inches.

6. The method of claim 1, wherein the first strain relief structure has a length between about 0.25-5 inches, the length being measured in a direction parallel to the side of the IGU on which the first strain relief structure is inserted.

7. The method of claim 1, wherein the first strain relief structure is integral with a cable and/or cable sheath.

8. The method of claim 1, wherein the first strain relief structure comprises electrical connections for directly connecting to the wires.

9. The method of claim 8, wherein the electrical connections comprise tabs, sockets, springs, clamps, conductive adhesive, or pads.

10. The method of claim 1, wherein the first strain relief structure comprises a surface that is not smooth.

11. The method of claim 1, further comprising applying tape to the periphery of the spacer to fasten the one or more wires thereto.

12. The method of claim 11, wherein the strain relief structure is shaped such that a shortest route for moisture to travel between (i) the secondary seal where the one or more wires enter the secondary seal and (ii) the tape, comprises at least 4 corners.

13. The method of claim 11, wherein the strain relief structure is shaped such that a shortest route for moisture to travel between (i) the secondary seal where the one or more wires enter the secondary seal and (ii) the tape, has a distance of at least about 0.5 inches.

14. The method of claim 11, wherein the tape comprises an interior-facing surface that faces the interior of the IGU and an exterior-facing surface opposite the interior-facing surface, wherein the exterior-facing surface of the tape comprises a material compatible with material used for the secondary seal.

15. The method of claim 14, wherein the exterior-facing surface of the tape is not smooth.

16. The method of claim 11, further comprising providing an additional layer of adhesive between the spacer and the secondary seal, the additional layer of adhesive in direct contact with the secondary seal and comprising a material that is compatible with the secondary seal.

17. The method of claim 1, further comprising routing the one or more wires to a single point along the periphery of the partially fabricated IGU, wherein passing the one or more wires through the first strain relief structure comprises passing all the wires through the first strain relief structure.

18. The method of claim 17, further comprising providing a wire bundle coating around the one or more wires after the one or more wires reach the single point along the periphery of the partially fabricated IGU.

19. The method of claim 1, wherein the one or more wires are coated with an insulating material that is compatible with a material used for the secondary seal.

20. The method of claim 19, wherein the secondary seal is a silicone-based material, and wherein the insulating material coating the one or more wires comprises silicone, a silicone-based material, and/or a silicone-compatible material.

21. The method of claim 19, wherein the secondary seal is a polyurethane-based material, and wherein the insulating material coating the one or more wires comprises polyurethane, a polyurethane-based material, and/or a polyurethane-compatible material.

22. The method of claim 1, wherein the first strain relief structure comprises a material that is compatible with a material used for the secondary seal.

23. The method of claim 22, wherein the secondary seal is a silicone-based material, and wherein the first strain relief structure comprises silicone, a silicone-based material, and/or a silicone-compatible material.

24. The method of claim 22, wherein the secondary seal is a polyurethane-based material, and wherein the first strain relief structure comprises polyurethane, a polyurethane-based material, and/or a polyurethane-compatible material.

25. The method of claim 22, wherein the secondary seal is a polysulfide-based material, and wherein the first strain relief structure comprises polysulfide, a polysulfide-based material, and/or a polysulfide-compatible material.

26. The method of claim 1, further comprising:
passing one or more wires through a second strain relief structure; and
providing tension on the one or more wires such that the one or more wires do not contact the first or second lites.

27. The method of claim 26, wherein a pocket of the first strain relief structure comprises a flexible portion that bends to at least partially surround the one or more wires to help maintain the one or more wires within the pocket of the first strain relief structure.

28. The method of claim 1, wherein the first strain relief structure comprises a body and legs that extend outward from the body, the legs having rounded ends that contact the first and second lites.

29. The method of claim 28, wherein the first strain relief structure comprises at least four legs, at least two of which contact the first lite, and at least two of which contact the second lite.

30. The method of claim 1, wherein the first strain relief structure comprises legs that bend toward one another and close off the pocket.

31. The method of claim 1, wherein the first strain relief structure operates to clamp the one or more wires to hold the one or more wires in place.

32. An electrochromic IGU comprising:
a first lite and a second lite, wherein at least one of the first and second lites comprises an electrochromic device thereon;
a spacer separating the first lite from the second lite;
a primary seal positioned between the spacer and the first lite, and between the spacer and the second lite;
busbars for powering the electrochromic device;
wires electrically connected to the busbars;
a secondary seal positioned around the spacer and between the first and second lites; and
a strain relief structure positioned between the first and second lites along a first side of the IGU, the strain relief structure comprising a body and a hole or pocket formed in the body,
wherein at least one of the wires passes through the hole or pocket in the strain relief structure,
wherein the body and the hole or pocket of the strain relief structure are shaped to relieve a strain on the wires,
wherein the strain relief structure is deformable,
wherein the strain relief structure is separate from the secondary seal,
wherein the strain relief structure extends along only a portion of the first side of the IGU,
wherein the strain relief structure has a width that is at least about 0.05 inches greater than a distance between the first and second lites, the width being measured in a direction between the first and second lites, and
wherein the strain relief structure exerts a compressive force on the first and second lites where the strain relief structure is positioned between the first and second lites.

* * * * *